United States Patent [19]

Vince

[11] 4,244,308

[45] Jan. 13, 1981

[54] SEED DRILLS

[76] Inventor: Albert E. Vince, 25 Station Rd., Wokingham, England

[21] Appl. No.: 942,964

[22] Filed: Sep. 18, 1978

[51] Int. Cl.³ .......................... A01C 5/00; A01C 5/02
[52] U.S. Cl. ...................................... 111/89; 111/92; 221/267
[58] Field of Search ...................... 111/89, 90, 91, 92, 111/93, 94, 95, 96, 97, 98, 99; 47/77; 124/1, 79; 206/39.4, 531, 533, 537, 540, 250, 253; 221/312 R, 64, 267, 307, 310

[56] References Cited

U.S. PATENT DOCUMENTS

| 70,747 | 11/1867 | Russell et al. | 111/96 |
|---|---|---|---|
| 1,080,248 | 12/1913 | Bell | 221/312 R |
| 2,457,345 | 12/1948 | Carline | 221/64 |
| 2,800,865 | 7/1957 | Gathercoal | 111/99 |
| 3,903,643 | 3/1974 | Blackmore et al. | 47/77 |

FOREIGN PATENT DOCUMENTS

| 540268 | 10/1941 | United Kingdom | 111/96 |
|---|---|---|---|
| 1218315 | 1/1971 | United Kingdom | 111/89 |
| 1483549 | 8/1977 | United Kingdom | 111/92 |

Primary Examiner—Edgar S. Burr
Assistant Examiner—James R. Feyrer
Attorney, Agent, or Firm—Fulwider, Patton, Rieber, Lee & Utecht

[57] ABSTRACT

A seed drill for planting seeds, comprising a seed container having a flexible base with a bore, and one or more slots radiating from the bore, formed therein, and a dibber rod movable axially of the bore whereby to engage and eject from the container a seed located in the bore.

14 Claims, 6 Drawing Figures

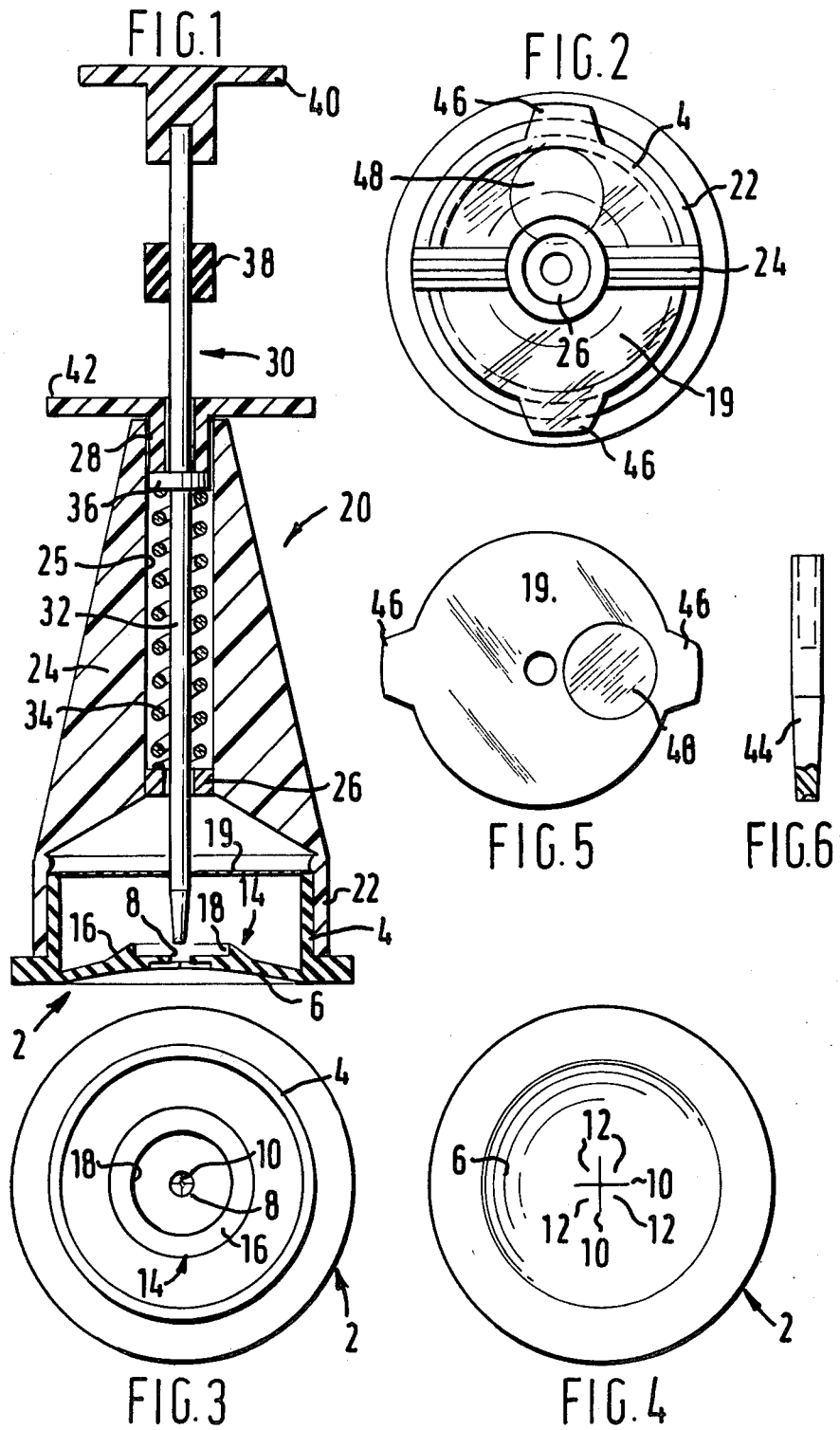

SEED DRILLS

This invention relates to seed drills, particularly hand-operated seed drills.

The precision placing of seeds in predetermined locations, either singly or in controlled quantities, is desirable for reasons of economy and successful germination. Heretofore such control in the planting of seeds has only been available for large scale operations and by means of complicated and expensive machines.

According to the present invention there is provided a seed drill comprising a seed container including a base portion of a flexible material part way through which base portion is formed a bore one end of which communicates into the interior of the container, one or more slits being formed in said base portion to extend substantially diametrically of the bore and to interconnect the other end of said bore with the exterior of the container, the drill further comprising a dibber movable axially of the bore between a normal rest position in which the operative end extent thereof is within the container and a fully displaced position in which said operative end extent of the dibber extends through the bore and slit(s) to the exterior of the container, whereby one or more seeds located in the bore are ejected by the dibber out of the container.

Preferably the base portion is convex inwardly of the container, the bore being formed at the peak of the base portion.

A pair of intersecting slits may be formed in the base portion, said slits intersecting substantially on the central longitudinal axis of the bore.

In a preferred embodiment of the invention the surface of the base portion within the container has formed thereon an upstanding ridge surrounding the bore and dividing said base portion into inner and outer sections, the ridge being so shaped as to permit, on shaking of the drill, ready movement of seeds resting on the outer section of the base portion from said section onto the inner section of the base portion while substantially preventing movement in the opposite direction from the inner section onto the outer section.

A seed drill according to the invention may further comprise an elongate body portion, the seed container being releasably received in one end of said body portion and the dibber extending through, to be axially movable in, said body portion, the other end extent of the dibber remote from said operative end extent projecting from the other end of the body portion.

Conveniently the dibber is urged to its normal rest position by means of a coil spring contained within the body portion and reacting between said body portion and a fixed member mounted on the dibber, while the seed drill preferably further comprises an adjustable stop member mounted on the other end extent of the dibber, abutment of said stop member with the other end of the body portion in use of the drill determining the fully displaced position of the dibber. Said stop member may be of a natural or a synthetic rubber and be a sliding friction fit on the dibber.

Preferably the operative end of the dibber is dimpled, while the operative end extent of the dibber may be removable from the remainder of said dibber, the drill further comprising a plurality of additional operative end extents each having formed in the operative end thereof a dimple of different diameter.

By way of example only, an embodiment of the invention will now be described in greater detail with reference to the accompanying drawings of which:

FIG. 1 is a central vertical section through a seed drill according to the invention;

FIG. 2 is a plan view from above of the body portion and container of the drill of FIG. 1;

FIG. 3 is a plan view from above of the seed container of the drill of FIGS. 1 and 2;

FIG. 4 is a plan view from below of the seed container of FIG. 3;

FIG. 5 shows a lid portion for the seed container of a drill according to the invention, and FIG. 6 shows a removable end extent for the dibber of a drill according to the invention.

Referring to the drawings, the illustrated seed drill includes a seed container indicated generally at 2 of cylindrical shape, having an upstanding side wall 4 and a thin, flexible base portion 6. The container is conveniently formed of rubber with the base portion 6 being slightly convex inwardly of the container for reasons to be detailed below.

A cylindrical bore 8 is formed part way through the upper regions of, at the dome of, the base portion, while a pair of intersecting slits 10 extending diametrically of the bore are formed in the lower regions of said base portion to interconnect the lower end of the bore with the exterior of the container. The slits define between them four petals or lips 12, which combine, again as will be detailed below, to act as a one-way valve.

An annular ridge 14 is integrally formed on the upper surface of the base portion 6 to surround the bore 8 and to divide the base portion into inner and outer sections. The outer wall 16 of the ridge has a gradual inclination, while the inner wall 18 is vertical, such an arrangement permitting, on gentle shaking of container, seeds in the container to move from the outer section to the inner section but substantially preventing movement in the opposite direction. The container 2 is provided with a transparent, flexible lid 19.

The drill further includes an elongate body portion or housing 20 having a lower end portion 22 into which the sidewall 4 of the container 2 is a push-fit. Integral with the portion 22 is a main body extent 24 having a cylindrical bore 25 formed therethrough, a lower end wall 26 having a central aperture of diameter less than that of the bore 25 defining one end of said bore 25 and an upper end wall 28 also formed with a central aperture again of diameter less than that of the bore 25 defining the other end of said bore 25.

A dibber is indicated generally at 30 and comprises a cylindrical metal shaft 32 which extends through the aperture in the wall 28, through the bore 25 of the body extent 24, through the aperture in the wall 26 and through a central aperture in the lid 19 to terminate within the container 2, the shaft 32 being axially aligned with the bore 8 in the base portion 6 of said container.

The dibber is urged to its illustrated rest position by means of a coil spring 34 contained within the bore 25 and reacting between the lower end wall 26 of said portion and a fixed member 36 on the shaft 32, which member, in said rest position of the dibber, abuts the upper end wall 28 of the body extent 24.

As can be seen from the drawings, the lower end extent of the shaft 32 is tapered, the end of said extent being dimpled.

An adjustable stop member 38, conveniently of rubber, is mounted on the upper end extent of the shaft 32, said member being a sliding friction fit on said shaft, while a push-button 40 is secured to the upper end of the shaft 32.

It will be appreciated that the dibber 30 is movable axially relative to the body portion 20 and container 2 against the action of the spring 34, the extent of said movement being determined by the location of the stop member 38 on the shaft 32.

More particularly, the seed drill operates as follows:

The lid 19 of the container 2 is flexed open to permit a plurality of seeds to be poured into the container 2. The drill is then gently shaken from side to side to ensure that at least some of said seeds are on the inner section of the base portion 6 with one seed contained in the bore 8. The base portion 6 is placed on the soil and the dibber is depressed by means of the push button 40. The dimpled operative end of the shaft 32 is thus brought into engagement with the upper surface of the seed contained within the bore 8, further depression of the dibber flattening, by way of the seed in the bore 8 abutting the upper surface of the lips 12, the flexible base portion against, to compact, the soil. Still further depression of the dibber urges the seed in the bore 8 through the lips 12 and into the soil, the depth of the seed in the soil being determined by abutment of the stop member 38 with the end wall 28 of the body extent 24 which abutment defines the fully displaced position of the dibber.

On release of the dibber, the spring 34 returns said dibber to its normal rest position, during which return movement the base portion 6 returns to its convex configuration and the lips 12 serve to clean soil from the operative end extent of the shaft 32.

The operation is then repeated, the previous return movement of the base portion to its convex configuration in all probability having resulted in a further seed being located in the bore 8—if not, the drill is again gently shaken to achieve this aim.

In order to facilitate operation of seed drill in, for example, confined space or at, for example, the corners of seed boxes, the end wall 28 is provided with an increased-diameter disc member 42 which acts as a finger hold during depression of the dibber and obviates the necessity for firm engagement of the container 2 with the soil.

The dibber itself is conveniently provided with a removable operative end extent such as shown at 44 in FIG. 6, said end extent being of, for example, plastic and being a push-fit onto the end of the metal shaft 32. The end of the extent 40 is dimpled, a preferred drill according to the invention being provided with a plurality of interchangeable extents 44 each having formed therein a dimple of a different diameter to suit different sizes of seeds.

The lid 19, which is preferably provided with a pair of opposed flaps 46 to facilitate flexing of said lid when filling the container 2 with seeds, may incorporate therein a magnifying glass 48 directed onto the bore 10, while a drill including such a lid could further include, for example, a pencil-type torch adapted to illuminate the interior of the container 2 and enable close scrutiny of the seeds therein, particularly that or those in the bore 10.

Alternatively the lid 19 could be integrally moulded with the body portion 20, could be opaque and could incorporate a hinged member to permit filling of the container 2 with said container received within the end portion 22.

The drill described above can be used to plant accurately pelleted seeds of a wide variety of sizes, as well as small measured quantities of powder or granules such as fertiliser.

Although a drill having a container 2 provided with a single bore 8 therein has been described above, the invention in its broadest aspect extends to a drill having a container or tray in the base of which are formed a plurality of bores 8/slits 10. A single dibber can, in such a case, be used to eject seeds sequentially from the various bores. Alternatively it may prove possible to provide a single dibber having a plurality of end extents one for each bore 10 whereby depression of the dibber results in simultaneous ejection of seeds from said bores.

Other modifications to and variations from the illustrated arrangement will be clear to those skilled in the art.

For example, the stop member 38 may have a manually operable knurled nut engageable with shaft 32 to enable the stop member to be fixedly secured to the shaft.

What I claim is:

1. A seed drill comprising a seed container including a base portion of a resilient material, the surface of the base portion within the container having formed thereon an annular ridge dividing the base portion into an outer section and an inner section, said inner section including a seed-retaining bore extending part way through the base portion, one end of the bore communicating with the interior of the container, and the base portion having at least one slit formed therein to permit the other end of the bore to communicate with the exterior of the container, the seed drill further comprising a dibber movable from an inoperative position, remote from the base portion, to an operative position, in which the dibber extends through the recess and the slit to the exterior of the container, thereby ejecting any seed located in said bore, the base portion being in its unstressed condition of a shape convex inwardly of the container, with ridge forming the peak of the base portion, the ridge being so shaped as to permit, on sideways shaking of the drill, ready movement of seeds resting on the outer section of the base portion, from the outer section to the inner section, while substantially preventing movement in the opposite direction, from the inner section to the outer section.

2. A seed drill as claimed in claim 1 in which the container is of rubber.

3. A seed drill as claimed in claim 1 in which the container includes a transparent lid portion for retaining seeds within the container, the dibber extending through said lid portion.

4. A seed drill as claimed in claim 1 and further comprising an elongated body portion, the seed container being releasably received in one end of said body portion and the dibber extending through, to be axially movable in said body portion, the other end extent of the dibber remote from said operative end extent projecting from the other end of the body portion.

5. A seed drill as claimed in claim 4 in which the dibber is urged to its normal rest position by means of a coil spring contained within the body portion and reacting between said body portion and a fixed member mounted on the dibber.

6. A seed drill as claimed in claim 4 and further comprising an adjustable stop member mounted on the other end extent of the dibber, abutment of said stop member with the other end of the body portion in use of the drill determining the fully displaced position of the dibber.

7. A seed drill as claimed in claim 1 in which the operative end of the dibber is dimpled.

8. A seed drill as claimed in claim 7 in which the operative end extent of the dibber is removable from the remainder of said dibber, the drill further comprising a plurality of additional operative end extents each having formed in the operative end thereof a dimple of different diameter.

9. A seed drill comprising:
- a seed container including a base portion of a resilient material, the surface of the base portion within the container having formed thereon a ridge dividing said base portion into an outer section and an inner, recessed section, wherein said base portion is adapted to carry a supply of seeds in the outer section thereof, and wherein the inner section includes a seed-retaining bore, spaced from said ridge and extending part way through the base portion, for retaining a prescribed number of seeds, one end of the bore communicating with the interior of the container, and a plurality of slits formed in the base portion to permit the other end of the bore to communicate with the exterior of the container; and
- a dibber movable from an inoperative position, remote from the base portion, to an operative position, in which the dibber extends through the bore and the slits to the exterior of the container, thereby ejecting any seed located in the bore;
- wherein the base portion of the seed container is, in its unstressed condition, convex inwardly of the container, with the ridge forming the peak thereof, the ridge being so shaped as to permit, on sideways shaking of the drill, ready movement of a portion of the supply of seeds resting on the outer section of the base portion, from the outer section resting to the inner section, while substantially preventing movement in the opposite direction, from the inner section onto the outer section.

10. A seed drill as claimed in claim 9, wherein said ridge has an annular shape, and wherein said ridge includes an inner peripheral wall that is substantially perpendicular to the inner section of said base portion, and an outer peripheral wall that is tapered relative to the outer section of said base portion.

11. A seed drill as claimed in claim 9, in which the container includes a transparent lid portion for retaining seeds within the container, the dibber extending through said lid portion.

12. A seed drill as claimed in claim 9, in which the operative end of the dibber is dimpled.

13. A seed drill as claimed in claim 12, in which the operative end extent of the dibber is removable from the remainder of said dibber, the drill further comprising a plurality of additional operative end extents, each having formed in the operative end thereof a dimple of different diameter.

14. A seed drill comprising:
- a seed container including a base portion of a resilient material, the surface of the base portion within the container having formed thereon a ridge dividing said base portion into an outer section and an inner, recessed section, wherein said base portion is adapted to carry a supply of seeds in the outer section thereof, wherein the base portion is, in its unstressed condition, of a shape convex inwardly of the container, with the ridge forming the peak of the base portion and with the ridge being shaped to permit a portion of the supply of seeds to be moved thereover, from the outer section to the inner, recessed section, and wherein the inner section includes a seed-retaining bore, spaced from said ridge and extending part way through the base portion, for retaining a prescribed number of seeds, one end of the bore communicating with the interior of the container, and the base portion having a plurality of slits formed therein, to permit the other end of the bore to communicate with the exterior of the container;
- a dibber movable from an inoperative position, remote from the base portion, to an operative position, in which the dibber extends through the bore and the slits to the exterior of the container, thereby ejecting any seed located in said bore;
- an elongate body portion, the seed container being releasably received in one end of said body and the dibber extending therethrough, to be axially movable in said body portion, the other end extent of the dibber, remote from said operative end extent, projecting, from the other end of the body portion; and
- an adjustable stop member mounted on the other end extent of the dibber, abutment of said stop member with the other end of the body portion in use of the drill determining the fully displaced position of the dibber.

* * * * *